(12) United States Patent
Kodam et al.

(10) Patent No.: US 11,049,300 B2
(45) Date of Patent: Jun. 29, 2021

(54) DEVICES, SYSTEMS AND METHODS FOR MINI-BANNER CONTENT

(71) Applicant: DISH Network L.L.C., Englewood, CO (US)

(72) Inventors: Sheshank Kodam, Aurora, CO (US); Vijetha Balla, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 7 days.

(21) Appl. No.: 16/120,517

(22) Filed: Sep. 4, 2018

(65) Prior Publication Data

US 2020/0074706 A1 Mar. 5, 2020

(51) Int. Cl.
*G06T 11/60* (2006.01)
*G06Q 30/02* (2012.01)
*H04N 21/44* (2011.01)
*H04N 21/431* (2011.01)
*H04N 21/81* (2011.01)

(52) U.S. Cl.
CPC .......... *G06T 11/60* (2013.01); *G06Q 30/0276* (2013.01); *H04N 21/4316* (2013.01); *H04N 21/44008* (2013.01); *H04N 21/812* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,177,225 B1* | 11/2015 | Cordova-Diba | .......... | G06T 5/00 |
| 9,785,247 B1* | 10/2017 | Horowitz | .............. | G06F 3/0346 |
| 10,169,659 B1* | 1/2019 | Pearson | ................ | G06F 16/739 |
| 10,440,431 B1* | 10/2019 | Bulusu | ............... | H04N 21/4667 |
| 2009/0141940 A1* | 6/2009 | Zhao | .......................... | G06T 7/40 382/103 |
| 2011/0043524 A1* | 2/2011 | Chen | ....................... | G06Q 30/02 345/427 |
| 2013/0091445 A1* | 4/2013 | Treadway | .............. | G06F 3/0481 715/762 |
| 2016/0078659 A1* | 3/2016 | Bartkiewicz | ........... | G06Q 50/01 715/771 |
| 2016/0295157 A1* | 10/2016 | Cho | ..................... | G06F 16/9535 |
| 2017/0154240 A1* | 6/2017 | Vogiatzis | ........... | G06K 9/00671 |
| 2018/0070045 A1* | 3/2018 | Holmes | .............. | G06K 9/00335 |
| 2018/0232921 A1* | 8/2018 | Smith | ................ | G06Q 30/0201 |

* cited by examiner

*Primary Examiner* — Andrew G Yang
(74) *Attorney, Agent, or Firm* — Wash Park IP Ltd.; John T. Kennedy

(57) ABSTRACT

Devices, systems, and methods are provided for use in interpreting, converting, generating, embedding, presenting, storing and otherwise using mini-banner content. For at least one embodiment, a mini-banner content system may include a secondary content system element which executes non-transient computer executable instructions to configure: a content interpreter to interpret secondary content, identify aspect information, and output the aspect information; a content converter, which when receiving aspect information at least one of retrieves a first element corresponding to the aspect information and/or generates a second element corresponding to the aspect information, and generates a mini-banner content element based upon results of the retrieving operation and/or the generating operation.

20 Claims, 7 Drawing Sheets

DEVICES, SYSTEMS AND METHODS FOR MINI-BANNER CONTENT

TECHNICAL FIELD

The technology described herein generally relates to devices, systems, and methods for generating reduced format ("mini-banner") content. More specifically, the technology described herein generally relates to interpreting one or more frames of content, converting such content frame(s) into mini-banner content elements and embedding such content elements into a presentation of a primary content frame. More specifically, the technology relates to the interpreting, converting, embedding, presenting, storing and otherwise processing of various forms of audio, audio visual, graphical, visual, augmented reality, virtual reality, and other forms of content for presentation of such content as mini-banner secondary content presented in conjunction with one or more other frames of primary content.

BACKGROUND

Today, content exists in numerous forms including but not limited to audio, video, audio-video, graphical, virtual, tactile or otherwise. As used herein, content generally refers to any form of content and is not limited to its form or means of presentation to one or more persons. Content commonly can be further distinguished by its intended function. For example, certain content is referred to herein a "primary content" (PC). Non-limiting examples of primary content include feature films, televisions shows, audio recordings, webcasts, computer or other forms of electronic content, computer games, and otherwise. As defined herein, "primary content" is that content which one more persons (herein, "users") specifically selects to "consume" by listening, watching, or otherwise, being presented with such content and at any given time. It is to be appreciated, that primary content may be consumed by a user at any time, such as when the primary content is originally broadcast or otherwise first available for consumption, or at any later time. Further, it is commonly appreciated that primary content may be consumed using a growing and evolving selection of devices, systems, mediums, technologies, communications structures, formats, and otherwise. Non-limiting examples of primary content consumption devices include televisions, graphical displays on tablets, smartphones and other devices, virtual reality presentation devices, augmented reality systems, audio systems, and otherwise.

In addition to primary content, other forms of content, herein "secondary content" ("SC") is also commonly presented to a user. As used herein "secondary content" refers to content, in any format, that a user does not specifically request to consume. Secondary content may often be provided for a user's consumption in conjunction with or separate from any given piece or collection of primary content. Such pieces and/or collection of primary content, with respect to which one or more given elements of secondary content are to be consumed, may be determined in advance, real-time, after-time, based on any factor or variable, or otherwise determined. Non-limiting examples of secondary content include television commercials, web commercials, instructional content, augmenting reality content, virtual reality content, and other forms of content, the selection of which a user often has little, if any, control.

Today, various devices, systems, features and functions enable consumers of primary content to often skip, delay, fast-forward, ignore, delete, bypass, or otherwise not consume secondary content that has been presented for consumption to a user. For conciseness purposes only, such non-consumption of secondary content is defined herein as "skipping." Skipping can occur, for example, with the use of automated skipping features, fast forwarding through recordings, and otherwise. Often secondary content is required to be consumed in order for the user to consume given primary content.

Further, various devices, systems and processes today exist which enable creators of such secondary content to target given secondary content to particular users. By the use of demographic, personally identifying, anonymized data, user preferences and/or otherwise, producers, distributors and others associated with the providing of secondary content can specifically provide secondary content that actually is of interest to specific users. Users can be identified and/or targeted as one or more persons or groups of persons, such as a household or otherwise. Content that such specific users actually desire to consume, but, due to skipping, do not actually consume is often a missed opportunity for both the provider of the secondary content, the user, and others. Users often desire to know about secondary content of interest to them. Thus, a need exists for notifying users that skipped secondary content may actually contain content of interest to that user.

Further, the providing of secondary content as full frame advertisements, is often undesirable from the user's perspective, as such presentation often results in the expenditure of time and resources (e.g., screen area and processor time) that such user may desire to not spend on consuming secondary content that may or may not be of actual interest to them. Hence, the above described problem of secondary content that is of interest to such user often ending up being "skipped" is often exacerbated by device limitations and user preferences, with the end result being the secondary content of actual interest to the user not being consumed due to a lack of user awareness of the existence of such secondary content. Thus, devices, systems and methods are needed for addressing the above and related problems.

SUMMARY

The various embodiments of the present disclosure relate in general to devices, systems, and methods for use in generating, embedding, presenting and storing mini-banner content.

In accordance with at least one embodiment of the present disclosure, a mini-banner content system may include a secondary content system element having first non-transient computer executable instructions which configure a content interpreter to interpret secondary content and identify aspect information and output the aspect information. For at least one embodiment, a secondary content system element may include first non-transient computer executable instructions which configure a content converter to receive aspect information. The content converter may be coupled to the content interpreter. For at least one embodiment, the content converter may be configured, based on the received aspect information, to perform at least one of an element retrieving operation and element generating operation. The element retrieving operation may include retrieving a first element corresponding to the aspect information. The element generating operation may include generating a second element corresponding to the aspect information.

For at least one embodiment, the content converter may be configured to generate at least one mini-banner content element based upon results of at least one of the element retrieving operation and the element generating operation. The secondary content may include a frame of video content which may include one or more images depicting an aspect of secondary content. For at least one embodiment, a content interpreter may be configured to interpret the aspect of the secondary content and identify the aspect information.

For at least one embodiment, a mini-banner content system may include an element database. The element database may be communicatively coupled to the content converter. The element database may be configured to store at least one of the first element and the second element. At least one of the one or more elements that are stored in the element database may correspond to at least one aspect of the secondary content. The secondary content may include advertising content for an advertised article of commerce. The aspect of the secondary content may relate to the advertised article of commerce. The aspect of the secondary content may include a source of origin for the article of commerce.

For at least one embodiment, the content converter may be configured to output a mini-banner content element. The mini-banner content system may include a mini-banner content element database, communicatively coupled to the content converter, configured to store the at least one mini-banner content element output by the content converter. The mini-banner content element database may be configured to store the mini-banner content element output by the content converter in at least one of a standard content format, an augmented reality content format, and a virtual reality content format.

For at least one embodiment, a mini-system presenter may include second non-transient computer executable instructions which configure a mini-content embedder to embed a mini-banner content element into a primary content presentation. The mini-system presenter may include third non-transient computer executable instructions which configure content detector to determine a form of the primary content. The mini-content embedder may select the mini-banner content element to embed into the primary content presentation based on the form of the primary content. The form of the primary content may include virtual reality content. The mini-banner content element may include a mini-banner virtual reality content element. The mini-content embedder may select the mini-banner virtual reality content element to embed into the primary content presentation.

For at least one embodiment, the form of the primary content may include virtual reality content. The mini-banner content element may not a second mini-banner virtual reality content element. The mini-content embedder may be configured to generate, from the mini-banner content element, the second mini-banner virtual reality content element, and embed the second mini-banner virtual reality content element into the primary content presentation.

For at least one embodiment, a mini-system presenter may include a content detector, a display driver, and a mini-banner content embedder. The content detector may be configured to determine a form of primary content. The mini-content embedder may be configured to embed a mini-banner content element into the primary content and output combined content. The display driver may be configured to output the combined content, wherein the combined content is output for presentation to a user using a user device. The mini-banner content element may relate to an aspect of secondary content. The mini-banner content element, based on the at least one aspect, may be at least one of selected from an element database or generated. The mini-banner content element may be a mini-banner virtual reality content element.

For at least one embodiment, method for facilitating use of mini-banner content elements may include the operations of interpreting an aspect of secondary content. converting the aspect of secondary content into a mini-banner content element, and embedding the mini-banner content element into a presentation of primary content. Converting of the aspect of secondary content into the mini-banner content element may include selecting an element from an element database and generating a second element. At least one of the first element and the second element may correspond to the aspect of secondary content. The first element may be combined with the second element. The mini-banner content element may include a combination of the first element and the second element. At least one of the first element and the second may facilitate presentation of the mini-banner content element in a virtual reality form.

BRIEF DESCRIPTION OF THE DRAWINGS

The features, aspects, advantages, functions, modules, and components of the devices, systems and methods provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and methods for use in interpreting, converting, generating, embedding, presenting, storing and/or otherwise using mini-banner content (MBC). In accordance with at least one embodiment of the present disclosure, a system 100 is provided for receiving, interpreting, converting, generating, embedding, presenting, saving and otherwise processing one or more elements of secondary content (SC) into one or more instances of mini-banner content (MBC) to be presented with one or more instances of primary content (PC). One embodiment of such a system 100 is shown in FIG. 1.

Figure 1:
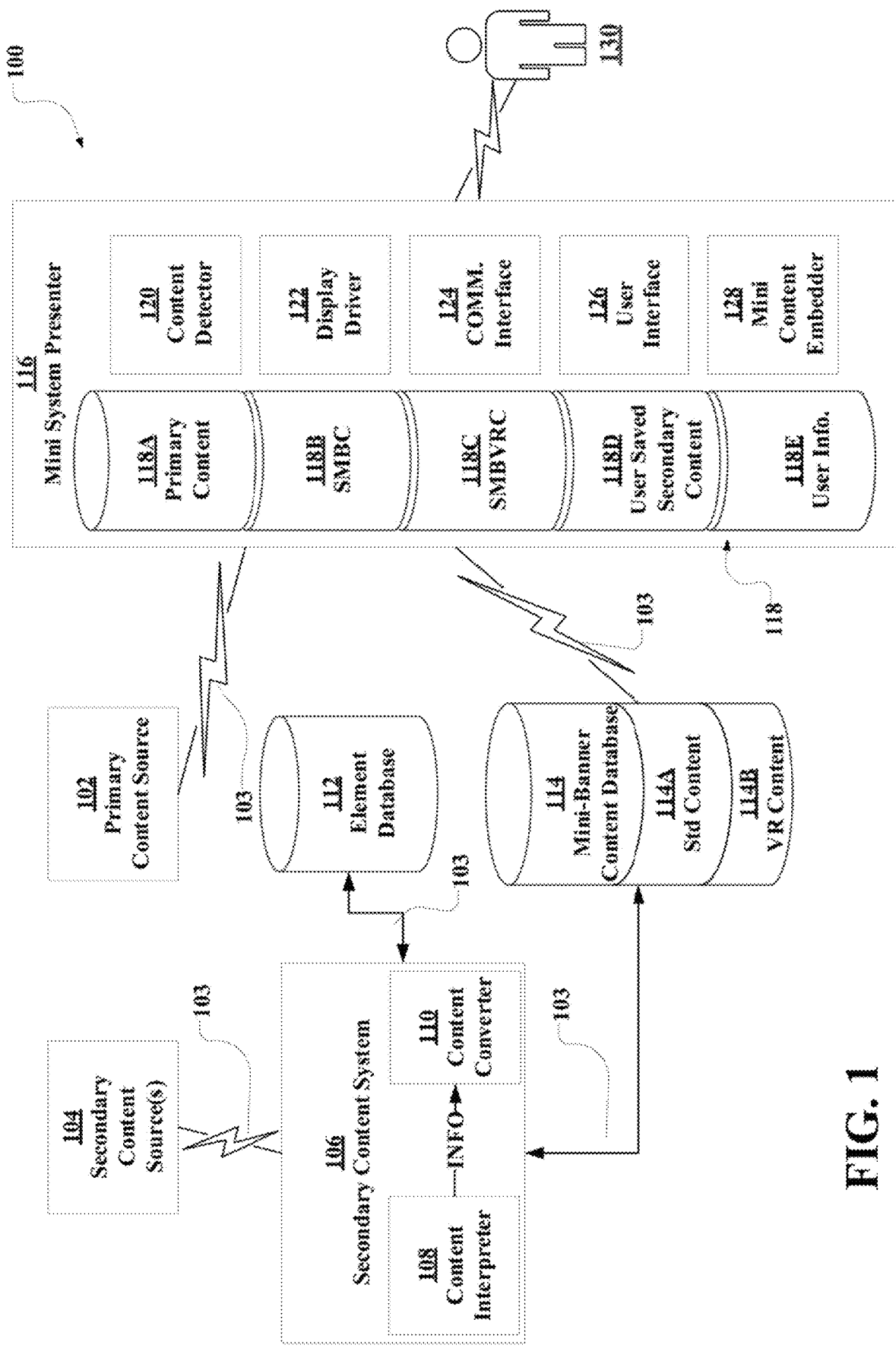
FIG. 1 is schematic representation of a system for use in generating, embedding, presenting and storing mini-banner content and in accordance with at least one embodiment of the present disclosure.

As shown in FIG. 1, one or more instances of primary content (PC) may be provided by one or more primary content sources 104. Examples of primary content sources include, but, are not limited to, creators, producers and distributors of television programming, movies, audio recordings, webcasts, or other content. Further, one or more instances of secondary content (SC) are provided by one or more secondary content sources (104). Examples of secondary content sources include, but are not limited to, creators, producers and distributors of advertisements, augmented reality content information, and otherwise. It is to be appreciated that one or more instances of primary content and/or secondary content may be delineated using any known or later arising designator. Examples of such designators may be by frame, packet (such as groups of packets commonly used with MPEG (Motion Pictures Expert Group) packaging of content), channel, sub-channel, frequency, time, or otherwise. For purposes of conciseness only, any such delineation of content instances are referred to herein as each being encapsulated and/or arising in a "frame."

More specifically, a content frame may include content arising over any given time period or other delineation. For example, a content frame for an audio sampling may arise over a time period. Similarly, a content frame for a video may correspond to one or more images, each of which may encapsulated as an image on a display at a given time, e.g., frames of video. Likewise, a designator for content may include descriptors associated with one or more human consumption variables. For example, a designator may specify that a given "frame" of content is intended for a person's consumption via their left or right ear, both ears or otherwise. Likewise, a designator may specify that an image frame or sequences of frames is intended for human consumption by viewing with a person's left eye or their right eye, as being "virtual" content, augmented content, or otherwise. Further, a designator may not be present, in which case a given frame of content may be intended for human consumption in a mono-audible, mono-visual or other single perspective formats.

As further shown in FIG. 1 and for at least one embodiment of the present disclosure, the system 100 may include a secondary content system 106 that is configured to receive the one or more frames of secondary content, from one or more secondary content sources 104, using one or more communications link 103. Such communications link 103 may include the use of any known or later arising data processing, networking, communications, or other technology. Examples of such communications technology include, but are not limited to, intra-computer data connections, such as by computer busses and otherwise, inter-computer data connections, such as by local area, wide area and other networks, cellular networks, wireless networks, mobile networks, satellite networks, broadband networks, the Internet, and other types of networking and/or communications technologies which facilitate the passing of data between computing and/or electronic devices. The characteristics, capabilities, limitations, technologies and otherwise of each such technologies are well known to a person of ordinary skill in the art and are incorporated herein by reference.

Likewise, the secondary content system 106, and other computing-based systems described herein, may be provided by any single or group of known or later arising electronic and/or computing devices. Examples of such devices include, but are not limited to, personal computers, mainframe computers, computer servers, rack of computer servers, distributed computing systems, or otherwise. The characteristics, capabilities, limitations, technologies and otherwise of such computing systems being known to a person of ordinary skill in the art and are incorporated herein by reference.

The secondary content system 106 may be configured to perform computer executable instructions stored non-transiently on a computer data storage medium which facilitate the provisioning of a content interpreter 108 and a content converter 110. Other features and functions may be provided by the secondary content system 106. It is to be appreciated that the features and functions of the content interpreter 108, content converter 110, and otherwise may be provided by hardware, software, and/or combinations thereof.

For at least one embodiment, secondary content system 106 may include a content interpreter 108 configured to interpret received frame(s) of secondary content. More specifically, the content interpreter 108 may be configured to apply artificial intelligence and/or machine learning to interpret content provided in the received one or more frames of secondary content and identify one or more aspects for such content. Such aspects may include those presentable to a user via use of an actual device, system, or property thereof. For example, audible content aspects may include, but are not limited to, frequency characteristics which correspond to sounds produced by a given person, group of persons, instrument, article of nature, article of commerce or otherwise. Similarly, visual content aspects may include, but are not limited to, one or more pixels or collections of pixels that may occur on one or more planes of reference, such as a mono-plane, a stereo (left-view, right-view) plane, a virtual-reality plane, augmented plane, or otherwise, where such pixels are representative of a real, virtual, augmented, or other humanly visually perceptible object or group of objects.

In accordance with at least one embodiment, the interpreting of content generally means to discern one or more aspects of such content so as to determine a feature, function or characteristic that can be associated with one or more real, augmented, or virtual elements that represent the associated content. It is to be appreciated, that content aspects may occur statically as at a given point of time, such as a photograph, or dynamically over a span of time, such as aspects provided for a motion picture, a video, or otherwise.

Figure 2A:
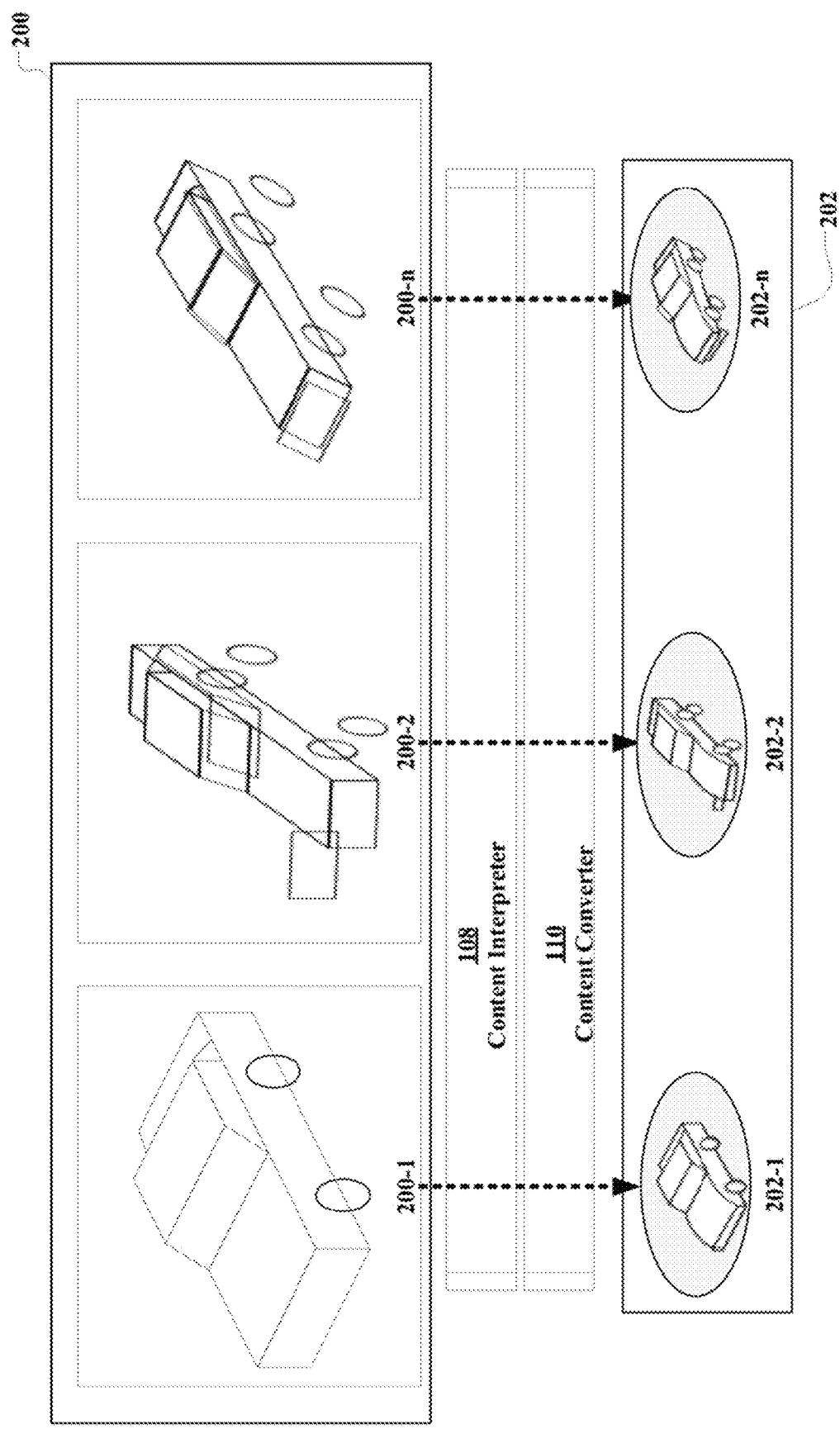
FIG. 2A is a pictorial representation of a conversion of multiple frames of secondary content (SC) into multiple frames of mini-banner content (MBC) and in accordance with at least one embodiment of the present disclosure.

Further, the interpreting of content per at least one embodiment, may arise with respect to any aspect thereof. For example, an interpretation of a frame of audio presenting a song for user consumption may include identify a person singing, a composer of such song, a musician or band of musicians playing such song, instruments utilized, a time, a place, or otherwise. Similarly, an interpretation of a frame of video promoting sells of a car, such as the frames 200 shown in FIG. 2, may include an identification in such video of various aspects, such as the type, age, make, model, color, or other characteristic of the car. Similarly, other non-tangible aspects associated with the car may also be interpreted, such as financing option, sales offered, discounts, price, or otherwise. Such interpretation may occur using any desired technology or combinations thereof which facilitate content interpretation, such as image recognition, text recognition, speech recognition, metadata interpretation, or otherwise.

As shown in FIG. 2, the aspects of the car, such as its size and dimensions, may be shown in multiple perspectives in the secondary content, as shown by frames 200-1, 200-2 and 300-*n* where respective first secondary content, second secondary content, and nth secondary content frames are shown. Background aspects may also arise in secondary content, but are not shown in FIG. 2. Such background aspects are not presented in the illustrative figures, but, could include any aspect of a frame of secondary content such as weather, location, geography, or otherwise. The content interpreter 108 may be configured to ignore or interpret such background aspects, as based upon any factor, such as one or more descriptors associated with the given secondary content that identify the central aspect or aspects of the secondary content, presented by the secondary content, one or more user preferences, device, technology, bandwidth or other technological constraints, or in view of any other desired factor. It is to be appreciated that for at least one embodiment, descriptors may be provided in meta data associated with a given secondary content or obtained from other sources that designates which aspects(s) of such secondary content are to be interpreted for use in mini-banner conversion, generation, embedding, presentation, storage or otherwise.

As discussed above, it is to be appreciated that any given frame may have multiple aspects. For example, a frame of video a house for sale, such as the frames 300 shown in FIG. 3, may include multiple aspects, such as a house 300-1 and a financing option 300-2. The aspects may be shown in single or multiple perspectives, as shown by frames 300-1, 300-2 and 300-*n* where respective first multi-element secondary content, second multi-element secondary content, and nth multi-element secondary content frames are shown. Accordingly, for at least one embodiment, the content interpreter 108 may be configured as a multi-element content interpret 302 that is configured to identify multiple aspects in one or more frames of content.

As further shown in FIG. 1, the secondary content system 106 may include a content converter 110. As shown with reference to FIGS. 2A, 2B and 3, the secondary content converter 106 may be configured to receive information ("info") from the content interpreter 108, which may be configured, as per the embodiment of FIG. 2, as a single aspect content interpreter or, as per the embodiment of FIG. 3, as a multi-aspect content interpreter 302. Based on the received information, the content converter 110 may be configured to identify and/or generate one or more mini-banner content (MBC) elements, such as a first mini-banner content 202-1 or a first multi-element mini-banner content 300-1, which respectively correspond, represent and/or reflect a given aspect of a frame of secondary content (e.g., a car) as interpreted by the content interpreter 108 or multiple aspects of the frame of secondary content (e.g., house and financing terms) as interpreted by multi-aspect content interpreter 302. MBCs may be converted to provide any desired perspective, including three-hundred-sixty-degree, stereo image, augmented reality, virtual reality, or otherwise.

More specifically and for at least one embodiment, a mini-banner content element generally is a virtual element that corresponds to the one or more content aspects identifiable in a given frame of secondary content. For example, a frame of an advertisement depicting a given car may be interpreted by content interpreter 108 as depicting aspects including a certain year, make and model of the car. This aspect information is then conveyed to the content converter 110 which may be configured to obtain one or more virtual representations of the given car, the representation(s) each being an element, from an element database 112. The element database 112 may be provided by any party, for example, by the manufacturer of the given car, by an advertiser promoting the car in the secondary content, by a content distributor, from unrelated third-party entities, or otherwise.

However, certain elements may not be available from an element database 112. Accordingly, and for at least one embodiment, the content converter 110 may be configured to generate content elements. Content elements may need to be generated, for example, when a desired element does not exist in an element database 112. For example, a first element corresponding to a car's aspect, such as a side view, may exist in element database 112. However, a second element, such as a rear view may not so exist. Accordingly, content converter 110 may be configured to generate a rear-view element based upon available information and using known or later arising rendering technologies. As discussed below, each of the side view element and the generated rear view element may be collectively bundled to provide a mini-banner content element, such as a mini-banner virtual reality content element, or an augmented reality content element, one or more of which enables a user to view an otherwise static image of a given car, in virtual reality, augmented reality, or otherwise and from one or more views.

Likewise, an element may not be accessible by a given secondary content system 106. Further an element may be deemed improper for any reason, such as type of content, characteristics of the content, user characteristics (e.g., age), or otherwise, use restrictions, such as promotional use terms or the like, and otherwise. Accordingly, for at least one embodiment of the present disclosure, elements may be obtained or generated, as desired for any particular use or implementation.

When generated, any desired technology may be utilized to convert info, about aspects of secondary content, into content elements. Such technologies may include device renderings based upon generalized dimensions or other characteristics of an item, avatar generation techniques, and otherwise. Further, the obtained and/or generated elements are bundled by content converter into a mini-banner content element. Such mini-banner content element may be bundled for standard reality, virtual reality, augmented reality, or other use configurations. As described herein, standard reality includes non-stereoscopic presentations of content to a user and virtual reality includes all other presentations.

Figure 3:
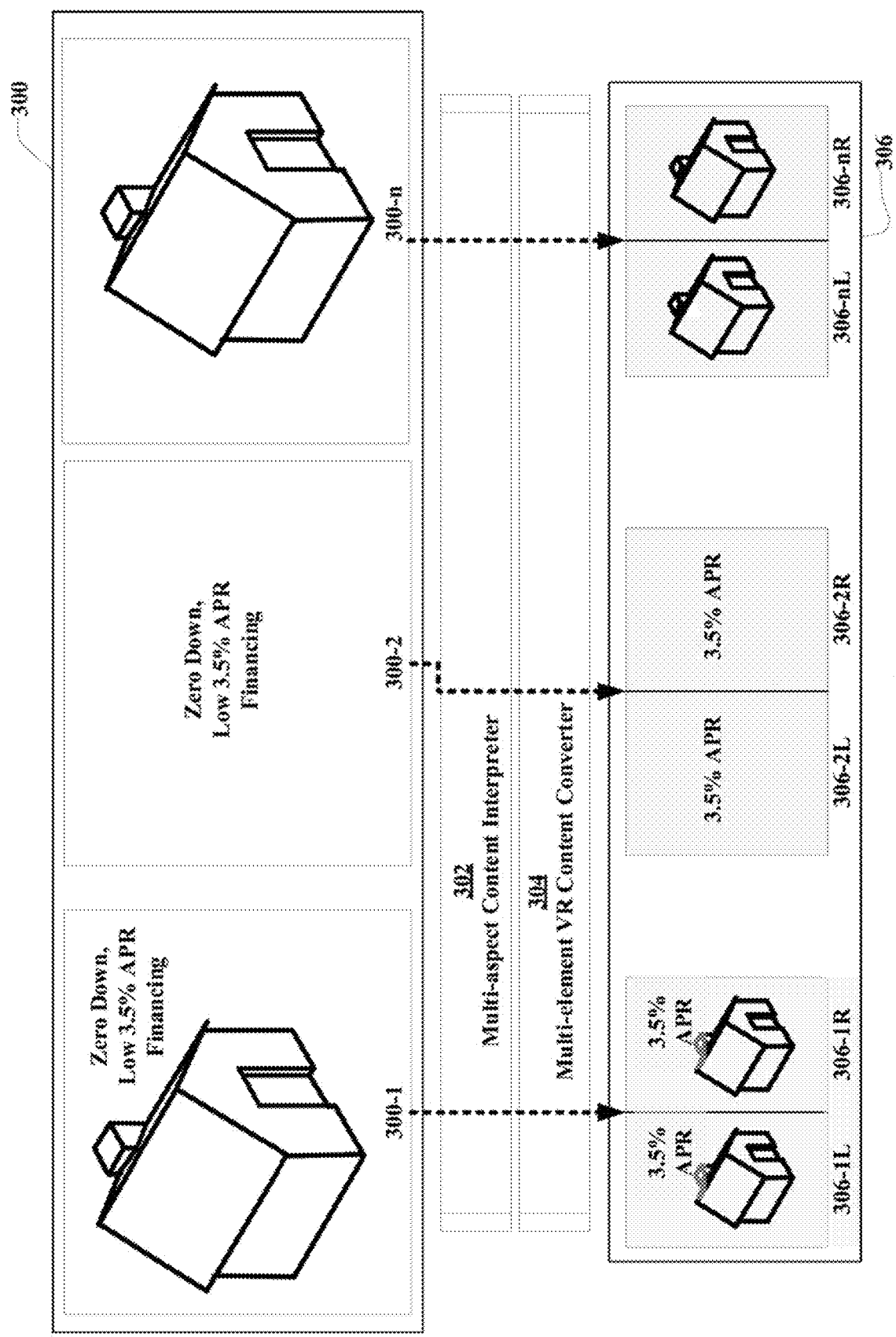
FIG. 3 is a second pictorial representation of a conversion of a given sampling of multiple frames of secondary content (SC) into multiple, sampled frames of mini-banner virtual reality content (MBVRC) and in accordance with at least one embodiment of the present disclosure.

One example of a content converter 110 generating a mini-banner virtual reality content element is shown with respect to FIG. 3 where the content converter 110 is a multi-element virtual reality (VR) content converter 304 configured to convert, for example, an aspect of a frame of secondary content, such as a promotional term, such a "Zero Down, Low 3.5% APR Financing," as shown by second multi-element secondary content 300-2, into a mini-banner virtual reality content element depicting "3.5% APR" in a stereoscopic (Left/Right) view, as shown by second mini-banner virtual reality content elements 306-1L and 306-1R. It is to be appreciated that "L" and "R" designate respective images for a user's left and right eyes needed to provide a virtual reality representation of a secondary content element.

Figure 2B:
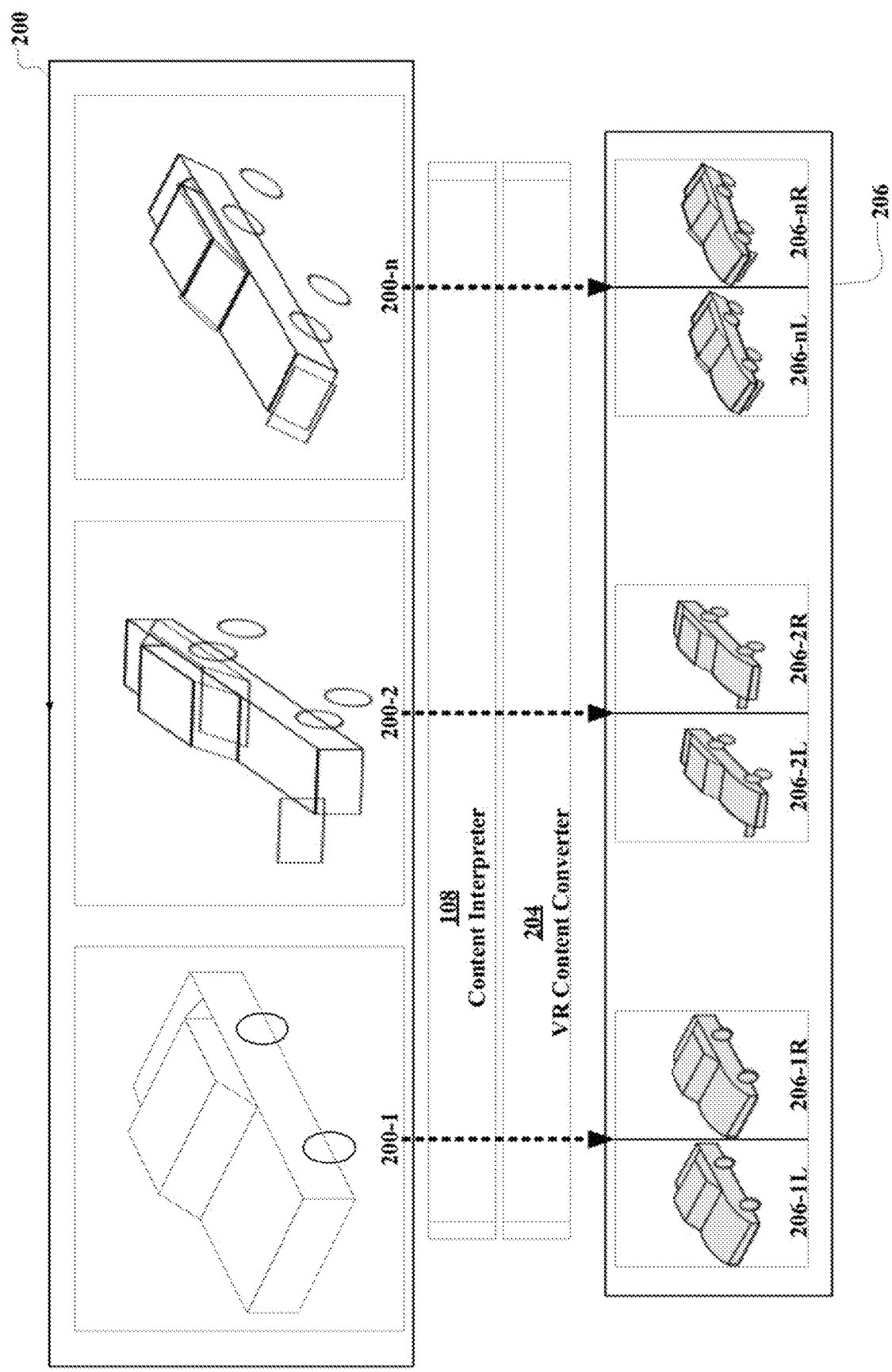
FIG. 2B is a pictorial representation of a conversion of multiple frames of secondary content (SC) into multiple frames of mini-banner virtual reality content (MBVRC) and in accordance with at least one embodiment of the present disclosure.

As further shown with reference to FIGS. 2B and 3, a content converter may be configured to generate mini-banner virtual reality content, as shown by a conversion of a first secondary content element 200-1 into mini-banner VR content elements 206-1L and 206-1R. As shown, corresponding conversions may be performed of second secondary content aspect 200-2 into second mini-banner virtual reality content elements 206-2L and 206-2R and/or nth secondary content aspect 200-n into nth mini-banner virtual reality content elements 206-nL and 206-nR. Likewise, as shown in FIG. 3, creation of virtual reality mini-banner content elements may occur with respect to single or multiple elements of a given frame of secondary content where, for example, both the house and the promotional term aspects in frame 300-1 are converted into mini-banner virtual reality content elements 306-1L and 306-1R, where only the promotional term element in frame 300-2 are converted into mini-banner virtual reality content elements 306-2L and 306-2R, and where only the house image aspect in frame 300-n is converted into mini-banner virtual reality content elements 306-nL and 306-nR.

It is to be appreciated that by converting a secondary content aspect into a mini-banner content element, whether virtual reality (VR) or standard (i.e., non-virtual reality), significant savings can be realized in the amount of data needed to communicate a second content aspect, the amount of data storage needed for such content aspect, computational and/or display resource needed to present a secondary content aspect—as represented by a mini-banner content element, and otherwise. Further, the conversion of secondary content aspect into mini-banner content elements may also provide, for at least one embodiment, presentation, manipulation and other characteristics not present using a secondary content aspect itself. Examples of such additional capabilities possible using mini-banner content elements include, but are not limited to, providing virtual-reality representations, providing manipulations of an element in different time, space, environments, backgrounds, or otherwise, and providing access to views and other information, such as information accessible via the Internet or otherwise, that is not available or accessible using a secondary content aspect itself. For example, a conversion of a secondary content aspect depicting a front view of a given car into a mini-banner virtual reality content element may enable a user to view virtual top, bottom, front, back, sides, interior, and other views of the given car—such views not being provided in the secondary content aspect itself, while also directly accessing a website providing car configuration options to the user. Other associated uses arising from mini-banner content elements may arise, as desired for any given embodiment of the present disclosure.

As further shown in FIG. 1 and as discussed above, for at least one embodiment, the system 100 may include one or more mini-banner content element databases 114 configured to store mini-banner content elements. The mini-banner content element database 114 may be configured to store given mini-banner content elements in one or more of a standard (non-virtual reality formatted) context form and/or a virtual reality context form, as provided by respective partitions 114A and 114B. That is, the system may be configured such that upon a given secondary content aspect being interpreted, elements obtained and/or generated, and such elements being converted into mini-banner content elements, such interpretations and/or conversions need not be repeated. It is to be appreciated, that such functionality facilitates the use of fewer network and/or computing resources, as interpretations of secondary content aspects and/or conversions of elements into mini-banner elements may otherwise be time, computing, network resource, or otherwise used. It is to be appreciated that mini-banner content elements may include one or more elements obtained from element database 112 or generated by content converter 110.

As further shown in FIG. 1, for at least one embodiment, the system 100 may include a mini-system presenter 116. A mini-system presenter 116 may include, be utilized in conjunction with, or be separate from any content processing utilized for and/or with a presentation/display system of primary content or secondary content. Non-limiting examples of such systems include set-top boxes utilized with cable, satellite, Internet, streaming and other content presentation services, smart-phones, computers, tablets, laptops, gaming devices, computing devices, audio, video and other presentation devices, and otherwise. The mini-system presenter 116 may be configured to embed one or more mini-banner content elements onto, in, and/or present with primary content. Further, it is to be appreciated that primary content may also be converted, generated, embedded and otherwise as mini-banner content elements in conjunction with other primary content presentations and/or secondary content presentations.

As per at least one embodiment, the mini-system presenter 116 may include a database 118, such as one provided on a digital video recorder, a cloud storage, or otherwise. It is to be appreciated that herein any known or later developed data storage technologies may be utilized for any data storage needed, including but not limited to local data storage, remote data storage, cloud-based storage, distributed storage, or otherwise. The database 118 may be partitioned or otherwise provided into distinct categories of content storage, such as, saved primary content 118A, saved mini-banner content (SMBC) 118B, saved mini-banner virtual reality content (SMBVRC) 118C, user saved secondary content (SC) 118D, and user information (UI) 118E, such as user preferences, demographics, settings and otherwise. For at least one embodiment, the saved content, in one or more of the categories, may include content designated for storage on the database 118 by any person or entity. For example, a content distributor may designate certain primary content and certain mini-banner content and/or mini-banner virtual reality content for storage on a given mini-system presenter 116. Similarly, a user may designate certain content for storage, such as a mini-banner content element that is of interest to the user. Further, the designation of certain content for storage in database 118 may result in an automatic, semi-automatic, manual or other designation of related content for storage on the database 118. For example, the mini-system presenter 116 may be configured such that when a user designates MBC or MBVRC elements for storage, storage also occurs of any secondary content in which a secondary content aspect arises and corresponds to the stored MBC/MBVRC element. For example, selection for storage of an MBC element for a given car may also result in storage of secondary content related to such given car. Further, it is to be appreciated that a given MBC or MBVRC element may correspond to one or more secondary content. For example, an MBC for the given automobile may correspond to each of a first secondary content (e.g., a first TV commercial for the car) and a second secondary content (e.g., a second TV commercial for the car). Thus, it is to be appreciated that by use of mini-banner content elements, storage space savings may be realized by the saving of a single mini-banner content element versus multiple secondary content frames.

As further shown in FIG. 1 and for at least one embodiment, a mini-system presenter 116 may also be configured to include a content detector 120. The content detector 120 may be configured to determine a form of primary content that is being presented or to be presented to the consuming person. For example, if the primary content is three-dimensional content, the content detector 120 will recognize the same and instruct system 116 components to present mini-banner content in a corresponding format, such as a VR format. The system 116 may also include a display driver 122. It is to be appreciated, however, the that display driver may be provided by a stand-alone device, such as TV or otherwise. The mini-system presenter 116 may also include a communications interface 124. Such interface 124 may be configured to facilitate communications by and between the mini-system presenter 116 and any other system 100 component or element, which also include user elements 130, such a display/presentation devices and otherwise. As per above, such communications may utilize any know or later arising technologies suitable for the purpose presenting mini-banner content elements to one or more users. The system may also include a user interface element 126. Such user interface element 126 may include any known or later arising technologies including but not limited to touch, voice, gesture, or otherwise.

Figure 4A:
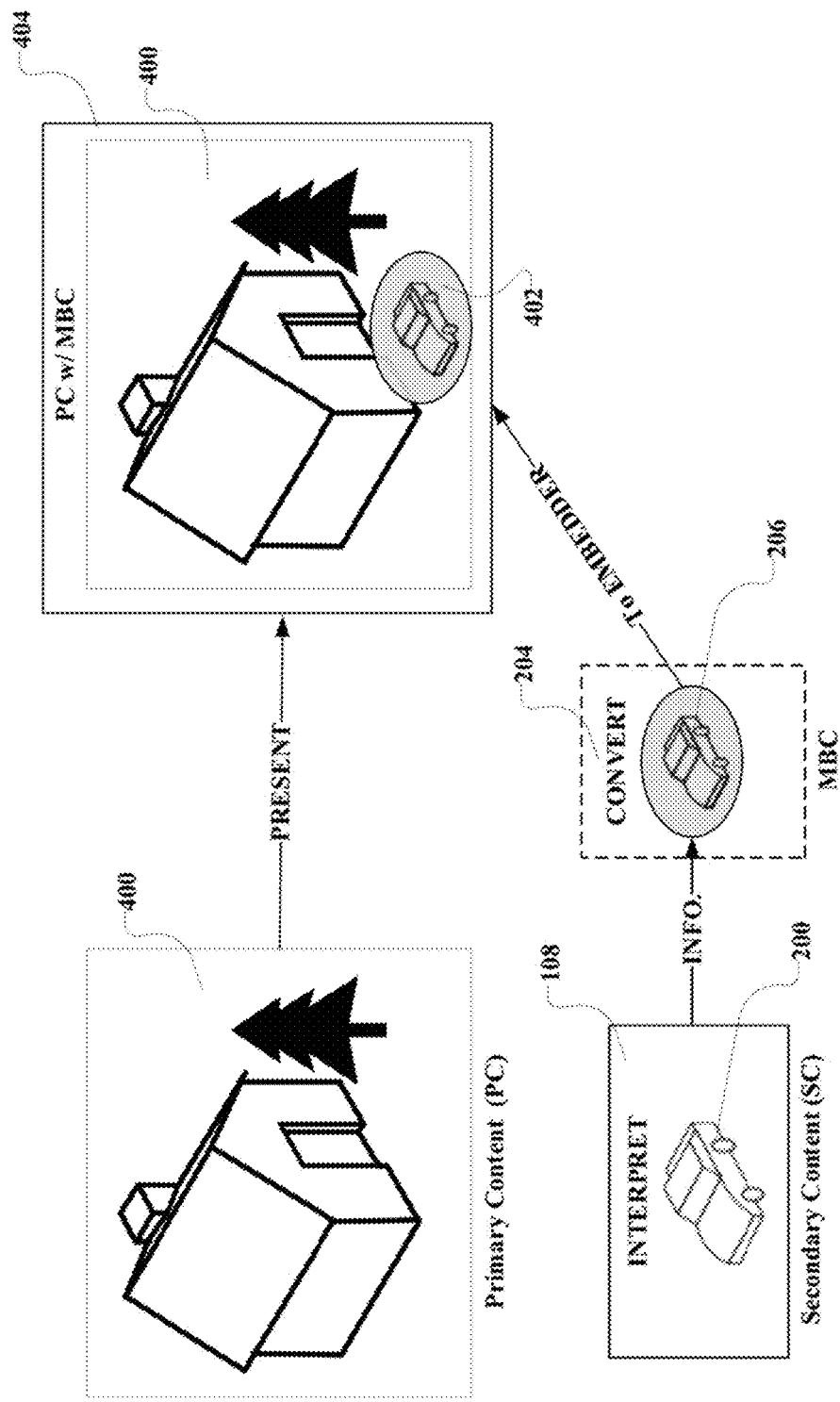
FIG. 4A is a pictorial representation of an interpreting and converting of a frame of secondary content (SC) into a frame of mini-banner standard content (MBSC) and embedding of the mini-banner standard content (MBSC) frame onto a presentation of a frame of mono-view (MV) primary content (PC) and in accordance with at least one embodiment of the present disclosure.

The mini-system presenter 116 may also include a mini-content embedder 128. As shown with respect to FIG. 4A, the mini-system content embedder 128 may be configured to embed a mini-banner content (MBC) element into a presentation of primary content 400. For example, a presentation of a frame of primary content 400 may include a story about a cabin in a forest. Such presentation may occur using a display device suitably coupled to a mini-system presenter 116. An advertisement, for example, secondary content 200 about an automobile, is to be presented in conjunction with the primary content 400. The secondary content 200 may be interpreted at the time of presentation or otherwise using content interpreter 108 to recognize the car aspect of the secondary content. Further, the information generated by the content interpreter 108 may be communicated to a converter, such as content converter 110, which obtains and/or generates one or more corresponding mini-banner content (MBC) elements. Similarly, a virtual reality content converter 204 may be utilized which generates one or more sets of mini-banner virtual reality content (MBVRC) elements 206, as shown in FIG. 2B. The mini-banner content elements may be provided to mini-content embedder 128. Mini-content embedder 128 suitably presents such mini-content banner elements in one or more MBC frames 402. The MBC frame(s) 402 may be presented with the primary content 400 to form combined content such as a primary mini-banner content image 404. The MBC frame(s) 402 may be presented in any format, such as picture-in-picture, as an overlay, as a portion of the primary content, or otherwise.

Figure 4B:
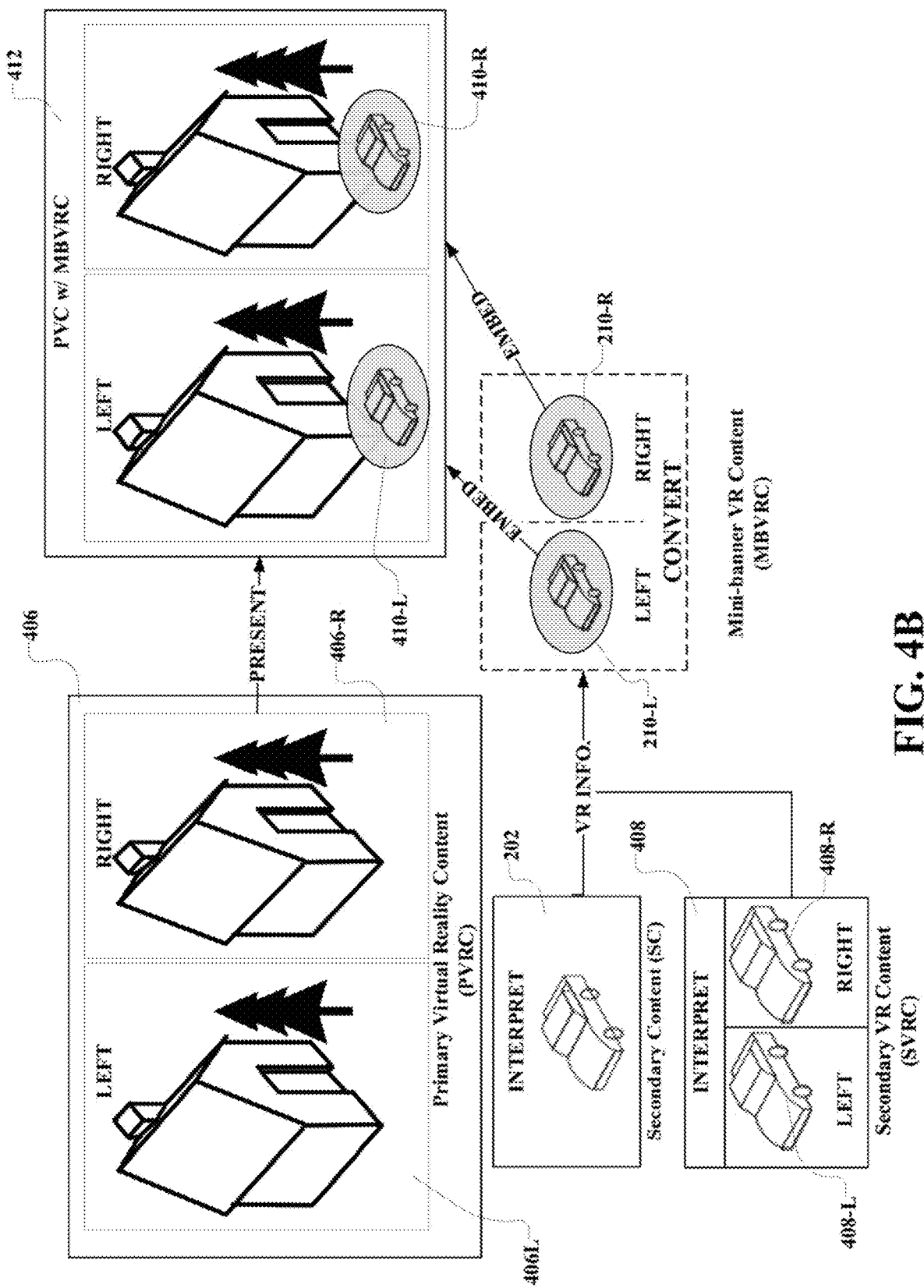
FIG. 4B is a pictorial representation of an interpreting and converting of a frame of either secondary content (SC) or secondary virtual reality content (SVRC) into a frame of mini-banner, virtual reality content (MBVRC) frame and embedding the MBVRC frame onto a frame of primary virtual reality content (PVRC) and in accordance with at least one embodiment of the present disclosure.

Similarly, and as shown in FIG. 4B with respect to virtual reality primary and/or secondary content, the mini-system content embedder 128 may be configured to embed mini-banner virtual reality content (MBVRC) elements into primary content. For example, primary content may include primary virtual reality content (PVRC) 406. One or more secondary content aspects may be desired to be presented in conjunction with the primary virtual reality content 406. When the one or more secondary content elements are in standard content form 202, such content may be interpreted and converted into MBVRC elements 210-L and 210-R, as discussed above. Similarly, one or more secondary content elements may be provided as secondary virtual reality content (SVRC) aspects, such as aspects 408-L and 408-R. These SVRC elements may be interpreted and then converted by a VR content converter, such as converter 204. The resulting mini-banner virtual reality content (MBVRC) elements may then be provided to mini-content embedder 128. Mini-content embedder 128 suitably presents such mini-content banner virtual reality content (MBVRC) elements in one or more MBVRC frames 410 with the primary virtual reality content 406 to form a combined primary mini-banner virtual reality content image 412. The MBVRC frames 410 may be presented in any format, such as picture-in-picture, as an overlay, as a portion of the primary content, or otherwise.

Figure 5:
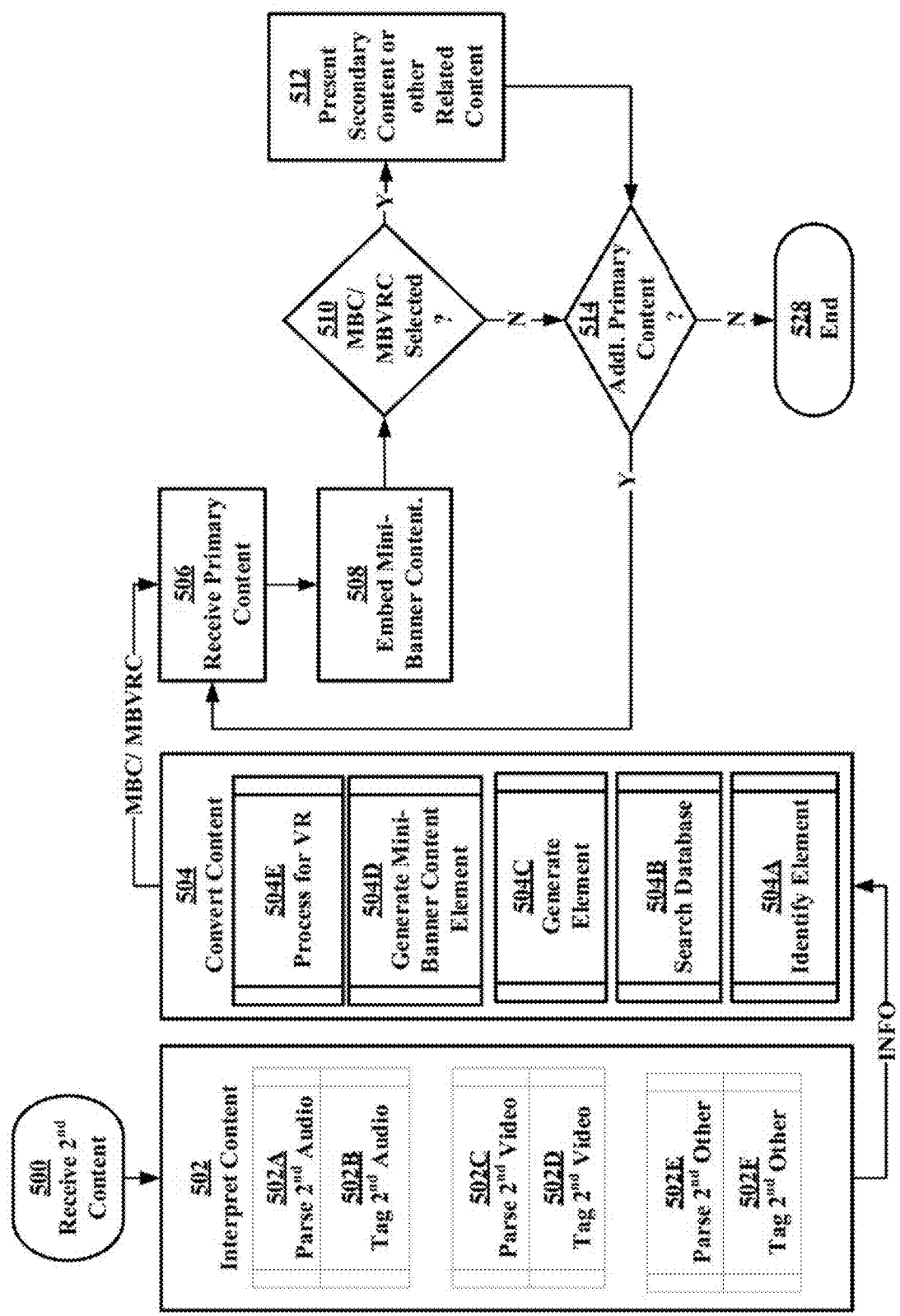
FIG. 5 is a flow chart illustrating a process for interpreting, converting and embedding secondary content into mini-banner content embedded onto a frame of primary content and in accordance with at least one embodiment of the present disclosure.

As shown in FIG. 5, at least one embodiment of the present disclosure includes a method for interpreting and converting secondary content aspects into mini-banner content elements and embedding the mini-banner content elements with primary content. The method begins, as per Operation 500, with receiving secondary content. Such secondary content may be received at any time prior, during, or after presentation of primary content. Further, secondary content may be associated at any time for presentation in conjunction with more than one primary content presentations, such as an automobile advertisement designated for presentation during each of a football game and a baseball game. Further, it is to be appreciated that method depicted in FIG. 5 may also be used with respect to primary content which may also be converted, generated, embedded and otherwise as mini-banner content elements in conjunction with other primary content presentations and/or secondary content presentations.

As per Operation 502, the received secondary content is interpreted. Such interpretation may include interpreting one or more various aspects of the secondary content. Such one or more various aspects may arise in the same or different formats, for example, audio, video and other formats. As shown, Operation 502 may include one or more sub-operations that may be format and/or aspect specific. Examples of such sub-operations include parsing secondary content audio aspects, as per Operation 502A, and adding descriptors or "tags" to such parsed audio aspects, as per Operation 502B. Examples further include parsing and tagging of video, as per Operations 502C and 502D, and parsing and tagging of other forms of content aspects, as per Operations 502E and 502F. For at least one embodiment, content parsed and/tagged for a first format, such as audio, may be used in parsing and tagging content in a second format, such as video. For example, secondary content about an automobile may include audio aspects which identify the year, make and model of the promoted vehicle. Such audio information may be used to interpret the corresponding video aspects as relating to the audibly described vehicle.

As discussed above, Operation 502 results in the generation of information ("info") regarding one or more secondary content aspects. Such information is communicated to a standard or virtual reality content converter.

Per Operation 504, conversion of the one or more secondary content aspects into mini-banner content elements proceeds based on the information received from a content interpreter. Such conversion operations may include identifying corresponding elements as per Operation 504A. Such identification may be used to search, as per Operation 504B, an accessible database for elements, standard or virtual reality, that correspond to the aspect identified in the information and can be used to form a mini-banner content element. Alternatively, if an attempted identification and searching for saved elements is unsuccessful, content conversion may include generating an element, as per Operation 504C. Again, artificial intelligence, machine learning, and other advanced computing technologies may be utilized to generate the one or more elements to be used in a mini-banner content element. It is to be appreciated that such advanced computing technologies may be especially useful in generating elements from secondary content containing only standard elements (non-VR elements).

As per Operation 504D, the method may include generating the mini-banner content element from the one or more elements obtained or generated per Operations 504A-504C. It is to be appreciated that such generated mini-banner content elements may be suitably saved. For at least one embodiment, the generation of mini-banner content elements may be not be needed when an element obtained from storage or generated is sufficient, in and by itself for eventual embedding with primary content. As discussed above, once a secondary content aspect is identified, elements found and/or generated, and mini-banner content elements generated, such aspects, elements and/or mini-banner content elements may be saved for use with other secondary content referencing the same element or otherwise.

As per Operation 504E, the method may include processing of elements and/or mini-banner content elements for presentation in other environments such as virtual reality environments, augmented reality environments, and otherwise. Such processing again may used advanced computing technologies to provide any desired view, orientation, lighting, or otherwise with respect to one or more elements or mini-banner content elements. Results arising from such virtual reality and/or other reality processing may also be saved for further use, as per Operation 504D.

As per Operation 506, the method may include receiving primary content. The primary content may be received by a mini-system presenter or other device and using any known or later arising technologies.

As per Operation 508, the method may include embedding the previously identified mini-banner content element onto the primary content presentation. It is to be appreciated that the embedding may occur before presentation of the primary content or during a first or later arising presentation of the primary content. As discussed above, the embedding may occur in any format, such as picture-in-picture, overlay, standard reality, virtual reality, or otherwise. The embedding may occur for any desired length of time, such as during an entirety of a presentation of primary content or any portion thereof. User preferences may be utilized in determining the periods, conditions, or otherwise and if at all, during which mini-banner content elements are presented in conjunction with primary content.

As per Operation 510, when mini-banner content elements are embedded with primary content, the method may include the operation of determining whether one or more mini-banner content elements are selected by the user. For at least one embodiment, selection of a mini-banner content (MBC) element or a mini-banner virtual reality content (MBVRC) element may occur using any technology, such as voice, touch, gesture or otherwise. For at least one embodiment, selection may occur as a matter of viewing condition, such as a user must view a given quantity of mini-banner content associated with given secondary content under one or more conditions. For at least one embodiment, selection may occur in a multiple part method with a selection or tagging by a user of an MBC/MBVRC element during presentation of the primary content followed by a later arising accessing of such tagged MBC/MBRVC element for any purpose.

As per Operation 512, when a mini-banner content element is selected, the method may include the operation of presenting the related secondary content or other related content to the user. For at least one embodiment, other related content may be any content that relates, in whole or in part, to a selected MBC or MBVRC element. For example, when an MBC/MBVRC element is generated based upon an identification of a given home as an aspect of given secondary content, information about a builder of such given home may be provided. Similarly, when an MBC/MBVRC element is generated based upon an identification of one or more financing options, per Operation 512 information about terms of such offer, lender providing such options, or otherwise may be presented to the user. Further, it is to be appreciated that the presentation of secondary content or mother related content per Operation 512 may occur using the same or different one or more user presentation devices and at a then arising, later arising, or other time.

As per Operation 514, the method may include the operation of determining whether additional primary content is available for presentation. If yes, the method may continue with Operations 506 to 512, as discussed above. If no, then the method ends, as per Operation 528.

Accordingly, it is to be appreciated that the various embodiments of the present disclosure provide devices, systems, and methods for use in interpreting secondary content, identifying and/or generating elements used to convert one or more aspects of such secondary content into mini-banner content elements into standard, augmented reality, virtual reality and/or other perspectives, embedding such mini-banner content elements into primary content presentations, suitably storing aspects, elements, and/or mini-banner content elements, and otherwise using mini-banner content elements for any intended purpose. The various embodiments may be used without countless forms of content, both primary and secondary, with standard content, virtual reality content, augmented reality content, three-dimensional content, mixed format content (such as audio-video, audio-video-graphical, audio-video-tactile, or otherwise), at any given time, and using any desired form of user device, communications technology, databases, servers, and otherwise.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A mini-banner content system, comprising:
   a secondary content system element including first non-transient computer executable instructions which configure:
   a content interpreter to
     interpret secondary content,
       wherein the interpreting of the secondary content includes discerning one or more aspects of the secondary content to determine a feature, function or characteristic of the secondary content;
       wherein the one or more aspects of the secondary content includes:
         a visible aspect and at least one of a non-visible aspect and a background aspect of the secondary content;
         wherein the visible aspect, when rendered on a display device, is visually perceptible by a person; and
       based on an interpretation of the secondary content, identify aspect information,
         wherein the aspect information identifies the visible aspect and the at least one of the non-visible aspect and the background aspect; and
       output the aspect information;
   a content converter to:
     receive the aspect information;
     perform, based on the received aspect information:
       an element retrieving operation, for retrieving a first element corresponding to the aspect information; and
       an element generating operation, for generating a new second element in view of the received aspect information; and
     generate a mini-banner content element based upon results of the element retrieving operation and the element generating operation.

2. The mini-banner content system of claim 1,
   wherein the secondary content comprises a frame of video content.

3. The mini-banner content system of claim 2,
   wherein the frame of video content comprises one or more images depicting an aspect of the secondary content; and
   wherein the content interpreter is configured to interpret the aspect of the secondary content and identify the aspect information.

4. The mini-banner content system of claim 3, comprising:
   an element database, communicatively coupled to the content converter, and configured to store at least one of the first element and the second element;
   wherein at least one of the first element and the second element further correspond to the aspect of the secondary content.

5. The mini-banner content system of claim 4,
   wherein the secondary content includes advertising content for an advertised article of commerce; and
   wherein the aspect of the secondary content relates to the advertised article of commerce.

6. The mini-banner content system of claim 5,
   wherein the aspect of the secondary content includes a source of origin for the article of commerce.

7. The mini-banner content system of claim 3,
   wherein the content converter is configured to output the mini-banner content element; and
   wherein the mini-banner content system further comprises:
     a mini-banner content element database, communicatively coupled to the content converter, configured to store the mini-banner content element output by the content converter.

8. The mini-banner content system of claim 7,
   wherein the mini-banner content element database is configured to store the mini-banner content element output by the content converter in at least one of a standard content format, an augmented reality content format, and a virtual reality content format.

9. The mini-banner content system of claim 7, comprising:
   a mini-system presenter including second non-transient computer executable instructions which configure:
     a mini-content embedder to embed the mini-banner content element into a primary content presentation.

10. The mini-banner content system of claim 9,
wherein the mini-system presenter comprises third non-transient computer executable instructions which configure:
  a content detector to determine a form of the primary content; and
  wherein the mini-content embedder selects the mini-banner content element to embed into the primary content presentation based on the form of the primary content.

11. The mini-banner system of claim 10,
wherein the form of the primary content includes virtual reality content;
wherein the mini-banner content element comprises a mini-banner virtual reality content element; and
wherein the mini-content embedder selects the mini-banner virtual reality content element to embed into the primary content presentation.

12. The mini-banner system of claim 10,
wherein the form of the primary content includes virtual reality content;
wherein the mini-banner content element does not include a second mini-banner virtual reality content element;
wherein the mini-content embedder is configured to
  generate from the mini-banner content element the second mini-banner virtual reality content element; and
  embed the second mini-banner virtual reality content element into the primary content presentation.

13. A mini-system presenter, comprising:
a content detector;
a display driver;
a content interpreter;
a content converter; and
a mini-banner content embedder;
wherein the content detector is configured to determine a form of primary content;
wherein the content interpreter is configured to perform first non-transient computer executable operations including:
  interpret the primary content;
    wherein the interpreting of the primary content includes discerning one or more aspects of the primary content to determine a feature, function or characteristic of the primary content;
      wherein the one or more aspects of the primary content includes a visible aspect and a non-visible aspect of the secondary content;
      wherein the visible aspect, when rendered on a display device, is visually perceptible by a person; and
  based on an interpretation of the primary content, identify aspect information for the primary content;
    wherein the aspect information for the primary content identifies the visible aspect and the non-visible aspect;
wherein the content converter is configured to perform second non-transient computer executable operations including:
  receiving the aspect information from the content interpreter;
  retrieving a first element corresponding to the aspect information;
  generating a second element in view of the received aspect information; and
  generating a mini-banner content element using the first element and the second element;
wherein the mini-content embedder is configured to embed the mini-banner content element into the primary content and output combined content; and
wherein the display driver is configured to output the combined content to a user device for presentation to a user.

14. The mini-system presenter of claim 13,
wherein the mini-banner content element relates to an aspect of secondary content.

15. The mini-system presenter of claim 14,
wherein the mini-banner content element, based on the aspect of secondary content, is at least one of selected from an element database or generated.

16. The mini-system presenter of claim 15,
wherein the at least one mini-banner content element comprises a mini-banner virtual reality content element.

17. A method for facilitating use of mini-banner content elements comprising:
interpreting at least one aspect of secondary content;
wherein the interpreting of the at least one aspect of secondary content includes:
  discerning the at least one visible aspect of the secondary content to determine a humanly perceptible visible feature, function or characteristic of the secondary content; and
  discerning a background aspect of the secondary content;
based on an interpretation of the at least one aspect of secondary content, identifying aspect information;
  wherein the aspect information identifies the humanly perceptible visible aspect of the secondary content and the background aspect of the secondary content;
  converting, by a content converter, the aspect information into a mini-banner content element, by performing non-transient computer executable operations including:
    retrieving a first element corresponding to the aspect information;
    generating a new second element corresponding to the aspect information; and
    generating the mini-banner content element from both the first element and the second element; and
embedding the mini-banner content element into a presentation of primary content.

18. The method of claim 17,
wherein the first element is selected from an element database.

19. The method of claim 17, comprising:
combining, by the content converter, the first element with the second element; and
wherein the mini-banner content element comprises a combination of the first element and the second element.

20. The method of claim 19,
wherein at least one of the first element and the second element facilitates presentation of the mini-banner content element in a virtual reality form.

* * * * *